United States Patent von Willich et al.

[19]

[11] Patent Number: 6,021,197
[45] Date of Patent: Feb. 1, 2000

[54] METHOD AND APPARATUS FOR CONTROLLING THE OPERATION OF A SIGNAL DECODER IN A BROADCASTING SYSTEM

[75] Inventors: Manfred von Willich, Craighall Park; Simon Paul Ashley Rix, Transvaal, both of South Africa

[73] Assignee: Irdeto B.V., Hoofddorp, Netherlands

[21] Appl. No.: 08/665,605

[22] Filed: Jun. 18, 1996

[30] Foreign Application Priority Data

Jun. 23, 1995 [ZA] South Africa ........................... 95/5204

[51] Int. Cl.⁷ .......................... H04N 7/167; G11B 23/28; H04L 9/00; H04K 1/00
[52] U.S. Cl. ...................... 380/5; 380/3; 380/4; 380/10; 380/28; 380/30
[58] Field of Search ................... 380/4, 10, 21, 380/23, 28, 30, 25, 3; 348/461, 467

[56] References Cited

U.S. PATENT DOCUMENTS

| | | | |
|---|---|---|---|
| 4,868,877 | 9/1989 | Fischer | 380/25 |
| 4,887,296 | 12/1989 | Horne | 380/21 |
| 5,054,064 | 10/1991 | Walker et al. | 380/20 |
| 5,159,633 | 10/1992 | Nakamura | 380/10 |
| 5,237,610 | 8/1993 | Gammie et al. | 380/10 |
| 5,282,249 | 1/1994 | Cohen et al. | 380/10 |
| 5,420,866 | 5/1995 | Wasilewski | 380/10 |
| 5,600,378 | 2/1997 | Wasilewski | 348/461 |
| 5,625,693 | 4/1997 | Rohatgi et al. | 380/23 |
| 5,742,677 | 4/1998 | Pinder et al. | 380/25 |
| 5,870,474 | 2/1999 | Wasilewski et al. | 380/21 |

FOREIGN PATENT DOCUMENTS

| | | |
|---|---|---|
| 0 689 316 | 12/1995 | European Pat. Off. . |
| 0 696 141 | 2/1996 | European Pat. Off. . |

OTHER PUBLICATIONS

Trott A et al., "An Enhanced Cost effective Line Shuffle Scrambling System with Secure Conditional Access Authorization", *Proceedings from Eleven Technical Sessions of the 42nd Annual Convention and Exposition of the National Cable Television Association*, San Francisco, CA, Jun. 6–9, 1993, pp. 133–143.

*Primary Examiner*—Benjamin R. Fuller
*Assistant Examiner*—Robin Clark
*Attorney, Agent, or Firm*—Dicke, Billig & Czaja, P.A.

[57] ABSTRACT

In a method and apparatus for controlling the operation of a signal decoder in a broadcasting system, a broadcast signal and an encrypted signature are generated and the signature is added to the signal. The signal together with the signature is broadcasted and received in the decoder, where the signature is decrypted and compared with a verification value. If a match occurs, further operation of the decoder is allowed. If a match does not occur, further operation of the decoder is disallowed.

16 Claims, 3 Drawing Sheets

METHOD AND APPARATUS FOR CONTROLLING THE OPERATION OF A SIGNAL DECODER IN A BROADCASTING SYSTEM

BACKGROUND OF THE INVENTION

The invention relates to a method and apparatus for controlling the operation of a signal decoder in a broadcasting system and further to a method and apparatus for broadcasting a signal.

In a broadcasting system several broadcasting methods may be used including broadcast by way of satellite, terrestrial broadcast by way of antennas, and broadcast by way of cables. Broadcasting of signals may involve the use of either analogue or digital technology. In particular in a broadcasting system using digital technology, a digital data stream can be used to broadcast a multiplicity of programmes from a plurality of broadcasters. A standard for the broadcast of digital signals is the MPEG II standard. According to this standard a plurality of compressed digital data signals, emanating from a multiplicity of broadcasters, is multiplexed into a single digital transport stream. The transport stream may be modulated on a carrier prior to transmission.

Reception of such a broadcast signal requires a decoder which demodulates the digital transport stream, decompresses it and converts it into analogue format for reception. The decoder will identify the particular signals emanating from corresponding broadcasters and will present these signals on separate channels of the television or radio, for example, as specified by an information table in the digital transport stream.

It is possible for a broadcaster to control the operation of decoders by, for example, transferring control data, decoder operations settings, or any other data for controlling the operation of the decoder. Since a standard method of broadcasting digital signals is used, any broadcaster could broadcast a signal for controlling the operation of the decoders without authorisation of the owner or users of the decoders. Such control information broadcasted by an unauthorized broadcaster could for example be deleterious to the operation of the decoder for reception of broadcast signals emanating from authorized broadcasters.

It is therefore an object of the invention to provide a method for controlling the operation of a signal decoder in a broadcasting system which will allow controlling the operation by authorized broadcasters only.

It is a further object of the invention to provide an apparatus for controlling the operation of a signal decoder in a broadcasting system, which can be implemented in decoders to allow control of the operation by authorized broadcasters only.

It is a further object of the invention to provide a method and apparatus for broadcasting a signal adapted to be used in the described method and apparatus in such a manner that only authorized broadcasters can broadcast such signals.

SUMMARY OF THE INVENTION

According to the invention there is provided a method for controlling the operation of a signal decoder in a broadcasting system, including the steps of generating a broadcast signal, generating an encrypted signature and adding said signature to said signal, broadcasting said signal with said signature, receiving said signal in said decoder, decrypting said signature, comparing the decrypted signature with a verification value and, if a match occurs, allowing the further operation of said decoder, and, if a match does not occur, disallowing further operation of said decoder.

According to the invention there is further provided an apparatus for controlling the operation of a signal decoder in a broadcasting system, comprising means for receiving a broadcast signal with an encrypted signature, means for decrypting said signature, means for comparing the decrypted signature with a verification value, and means for allowing or disallowing normal operation of said decoder in dependence on the result of this comparison being a match or a mismatch, respectively.

In this manner a method and apparatus are obtained, in which the origin of a broadcast signal is verified and operation of the decoder is only allowed if the signature matches with the verification value. In this manner control of the operation of the decoder by unauthorized broadcasters is prevented.

BRIEF DESCRIPTION OF THE DRAWINGS

The invention will be further described by way of example with reference to the drawings.

DETAILED DESCRIPTION OF THE PREFERRED EMBODIMENTS

Figure 1:
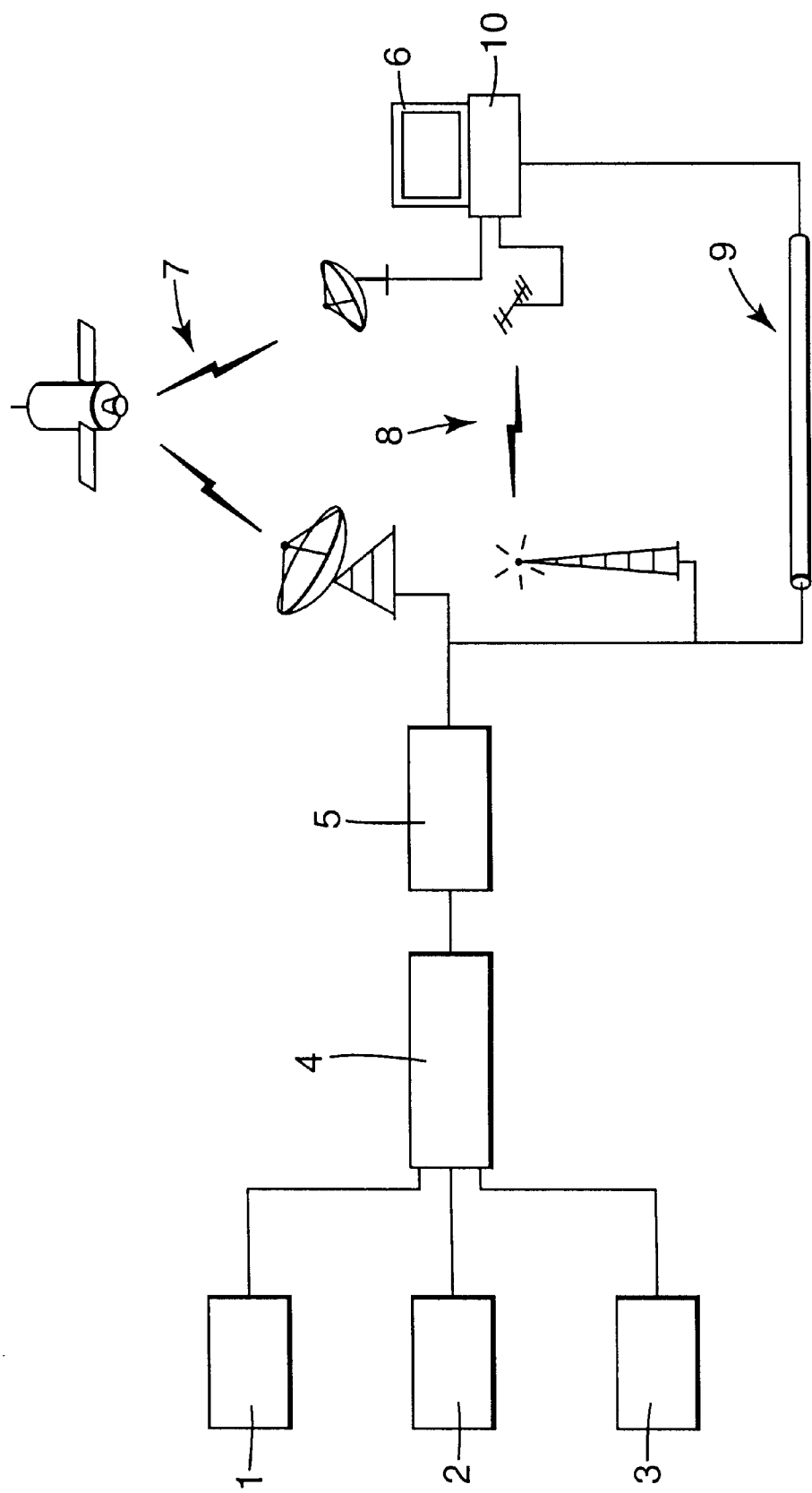
FIG. 1 shows a schematic diagram of a typical digital broadcast system with one of a large number of receivers including a decoder.

Referring to FIG. 1, there is shown a broadcasting system wherein three broadcasters 1–3 are coupled with a multiplexer unit 4. The multiplexer unit 4 comprises means for scrambling, encoding and compressing broadcast signals provided by the broadcasters 1–3 and the thus obtained digital data streams are multiplexed into a digital transport stream. In the embodiment shown this digital transport stream is modulated by way of a modulator 5 before transmission. The operator of the equipment including the multiplexer unit 4 and modulator 5 is responsible for transmitting the signal to the receiving equipment of the public, one television set 6 being shown by way of example in FIG. 1. One or more of the broadcasters 1–3 may be private broadcasters operating according to the concept of pay tv which implies subscription, which means that people wishing to view programmes broadcasted by a particular broadcaster, have to subscribe to such a broadcast, and pay the appropriate fee.

The transmission of the signal may be carried out through one or more telecommunication channels including a satellite link 7, a terrestrial link 8 or a cable system 9.

Figure 2:
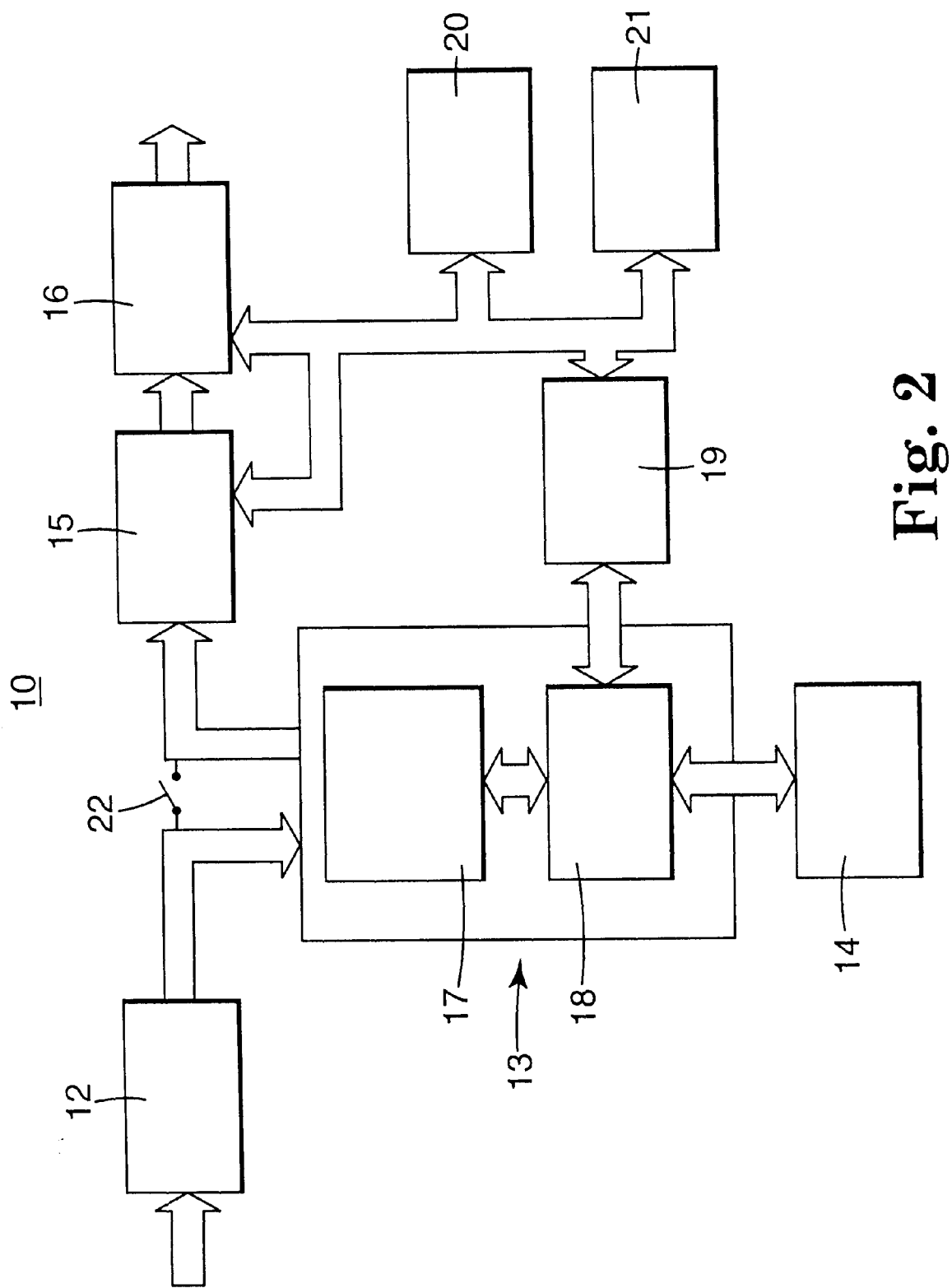
FIG. 2 is a schematic block diagram of the decoder including an apparatus for controlling the operation of the same.

Access to anyone of the broadcast signals provided by the broadcasters 1–3 requires a decoder 10 which is schematically shown in FIG. 2. Each decoder 10 is provided with a demodulator 12 for demodulating the received signal. Typically the input to the demodulator is a modulated data stream between 950 MHz and 2050 MHz. The output of the demodulator 12 is the digital transport stream. The decoder 10 is further provided with a conditional access module 13 cooperating with a smart card 14 in a manner known per se. Although in the embodiment described the conditional access module 13 and the smart card 14 are shown as separate units, it is not strictly necessary that they are separate. The conditional access module 13 may be incorporated in the decoder 10, for example.

Further the decoder is provided with a demultiplexer 15 for demultiplexing the digital transport stream and a decompression unit 16 for decompressing the signal to the original sequence of digital samples and for converting the digital samples into the original analogue audio and video format.

The conditional access module 13 includes a descrambler 17 with conditional access data filters and a microprocessor 18 to control the descrambler 17. The operation of the decoder 10 is controlled by a microprocessor 19 connected to a volatile memory 20 and non-volatile memory 21 for storing control information.

The digital transport stream generated by the multiplexer 4 may continuously or periodically include an information table containing information for the correct operation of the decoder. This information table contains among others a list of identifications of digital transport streams originating from authorized broadcasters. For a further explanation reference is made to publications on the MPEG standard. As any broadcaster could transmit signals to the decoders 10, it is important to allow only authorized broadcasters to control the decoder by storing an information table in the decoder memory. For this purpose the authorized operator of multiplexer 4 generates an encrypted signature and adds this encrypted signature to the digital transport stream provided by the multiplexer 4 at least when he wishes to provide the decoder 10 with a new information table. It is noted that the signature may be generated in the multiplexer or before the multiplexing stage. In the embodiment described an encrypted signature is generated by applying a one-way hash function to the information contained in the information table. The result of the one-way hash function is then encrypted using a secret key of a public key encryption method, for example the well-known RSA encryption method. However an encrypted signature may be generated in another suitable manner.

It is noted that an information table can be stored in the decoder memory during manufactoring of the decoder. During operation of the decoder 10 a new information table can be transmitted to the decoders at the subscribers over the telecommunication channel(s) used and this new information table can be stored either in volatile or non-volatile memory. Generally a identification number will be added to the information table so that the decoder 10 can compare this number with the number of the information table already available in the decoder.

Figure 3:
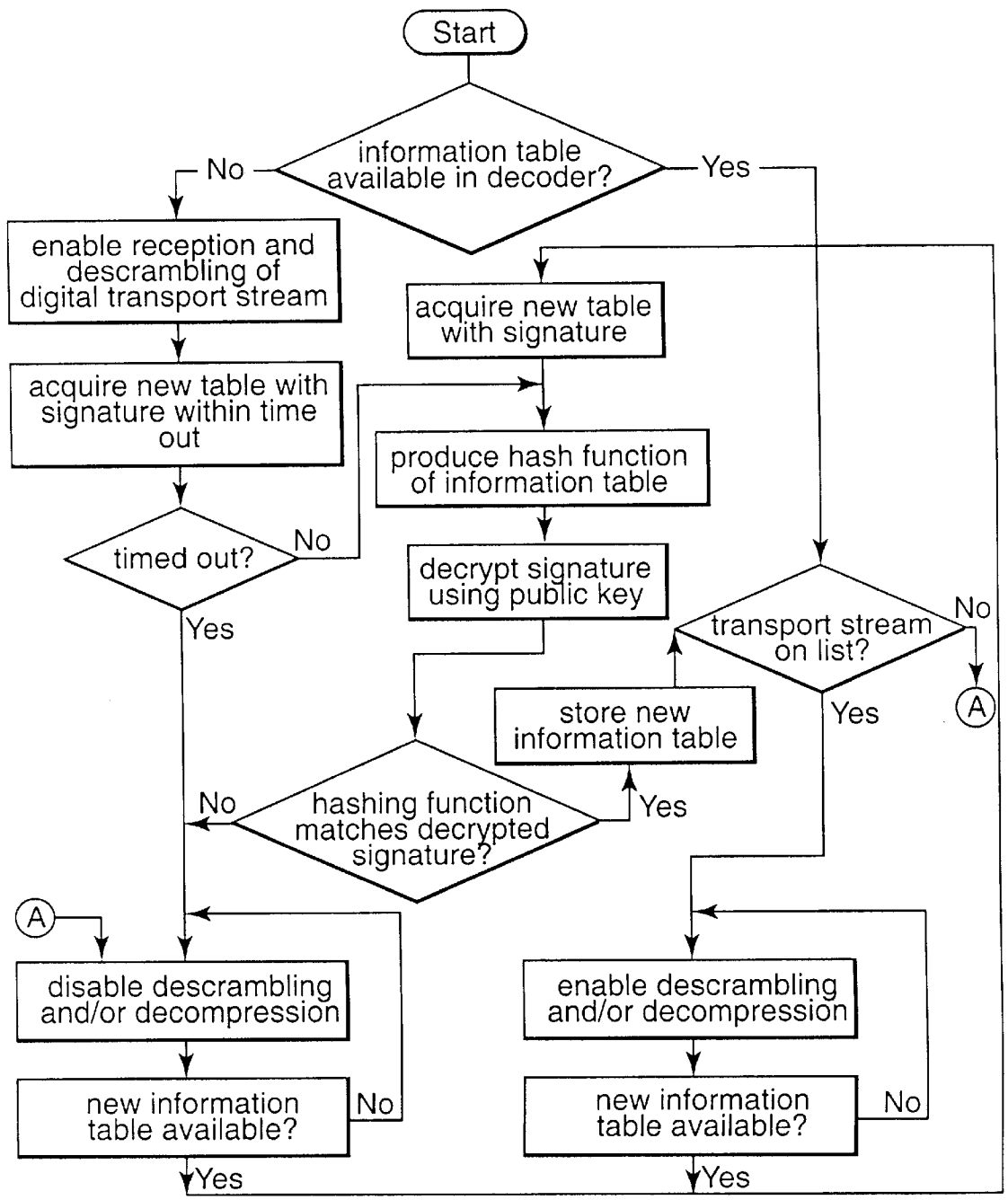
FIG. 3 is a flow diagram to explain the method of the invention.

When a decoder is switched on, microprocessor 19 will check whether an information table is available in the decoder 10 or not. If not, the microprocessor 19 will look for an information table and a signature in the digital transport stream within a specified time period as shown in the flow diagram of FIG. 3. To this end the digital transport stream from demodulator 12 is conditionally descrambled by descrambler 17 as controlled by microprocessors 18 and 19. As indicated in the flow diagram of FIG. 3, microprocessor 19 disallows further operation of the decoder if the specified time period elapses and an information table together with a signature is not found.

However, if an information table together with a signature is acquired within the specified time period, the signature is decrypted using the public key of the public key encryption method stored in the non-volatile memory 21 and the same one-way hash function as used at the transmitter side is applied to the information contained in the information table. The decrypted signature is compared with the result of the hash function and if a match occurs, the information in the information table is stored in nonvolatile memory 21 to be used for further operation of the decoder 10 in a normal manner. Thereafter the microprocessor 19 checks whether the identification of the transport stream received is on the list of identifications in the information table. If so, normal operation of the decoder 10 is enabled. This means that descrambling of the digital transport stream by the descrambler 17 continues and the descrambled data stream is demultiplexed and decompressed by demultiplexer 15 and decompression unit 16, respectively. However, if a match does not occur or the identification is not in the list, normal operation of the decoder is not allowed. For this purpose the microprocessor 19 may switch off decompression unit 16 so that the decoder 10 cannot be used at all. As an alternative microprocessor 19 may switch off descrambler 17 so that normal operation of the decoder 10 for unscrambled signals may continue. Switching off descrambler 17 may for example be obtained by directly connecting the output of demodulator 12 with the input of demultiplexer 15 through a switch schematically indicated with 22.

When at switching on the decoder 10 the microprocessor 19 finds that an information table is available, microprocessor 19 checks whether the identification of the transport stream received is on the list of identifications of the available information table. If not, normal operation of the decoder 10 is not allowed.

In both cases, i.e. normal operation allowed or disallowed, microprocessor 19 will continuously check whether a new information table is present in the transport stream received. As soon as the microprocessor 19 finds a new information table, microprocessor 19 will acquire the information table and signature from the transport stream and will start the verification of the information table received as described above.

As an alternative to using the information table generally available in a digital transport stream according to the MPEG standard, a new special information table may be created for example in the multiplexer 4. This special information table may for example be created from bits in the pay load part of the transport stream. The signature is thereafter generated in the same manner as in the above-described embodiment. Microprocessor 19 of the decoder 10 is programmed to create the same special information table and verification of the received signal again occurs in the same manner as described above.

The data bits from the pay load used for the special information table may either be selected according to a specific pattern or under control of a pseudo-random generator. In this latter case a corresponding pseudo-random generator is provided in the decoder 10.

From the foregoing description it will be understood that the invention provides a method and apparatus for controlling the operation of a decoder by authorized broad-casters only. Although in the preferred embodiment described the information table of the transport stream is used to generate an encrypted signature, it is also possible to generate an encrypted signature in another suitable manner and to verify this signature at the decoder to allow or disallow normal operation of the decoder depending on whether or not a match occurs with a verification value. Further it is noted that it is not strictly necessary to use a check on the identification of the transport stream to allow or disallow normal operation of the decoder.

Therefore, the invention is not restricted to the above-mentioned embodiments which can be varied in a number of ways within the scope of the claims.

What is claimed is:

1. Method for controlling the operation of a signal decoder in a broadcasting system, including the steps of generating a broadcast signal, generating an information table, adding said information table to said signal, generating an encrypted signature from the information in the information table and adding said signature to said signal, wherein said step of generating a broadcast signal includes generating a digital transport stream as a multiplex of a plurality of signal sources, wherein said information table includes identification and control data for the decoder wherein said digital transport stream includes a pay load part, broadcasting said signal with said signature, receiving said signal in said decoder, decrypting said signature, comparing the decrypted signature with information in the information table used as verification value and, if a match occurs, allowing the further operation of said decoder, and, if a match does not occur, disallowing further operation of said decoder.

2. Method according to claim 1 wherein said step of generating an encrypted signature includes reducing the information in the information table through a one-way hash function and encrypting the result of said hash function using a secret key of a public key encryption algorithm, wherein said encrypted signature is decrypted by means of the corresponding public key and said verification value is obtained by reducing the information table in the decoder through said one-way hash function.

3. Method according to claim 2, including the step of storing said information table, wherein the information table includes a list of transport stream identifications, wherein the identification of a transport stream received is compared with the list of identifications of the information table stored and wherein the operation of the decoder is allowed or disallowed in dependence on whether the identification is on the list or not.

4. Method for controlling the operation of a signal decoder in a broadcasting system, including the steps of generating a broadcast signal, generating a first information table from data in said signal, generating an encrypted signature from information in said first information table and adding said signature to said signal, wherein said step of generating a broadcast signal includes generating a digital transport stream as a multiplex of a plurality of signal sources, wherein said digital transport stream includes a pay load part, broadcasting said signal with said signature, receiving said signal in said decoder, generating a second information table in the signal decoder in the same manner as said first information table from data of said received signal decrypting said signature, comparing the decrypted signature with information in the second information table used as verification value and, if a match occurs, allowing the further operation of said decoder, and, if a match does not occur, disallowing further operation of said decoder.

5. Method according to claim 4, wherein said step of generating an encrypted signature includes reducing the information in the first information table through a one-way hash function and encrypting the result of said hash function using a secret key of a public key encryption algorithm, wherein said encrypted signature is decrypted by means of the corresponding public key and said verification value is obtained by reducing the information of said second information table in the decoder through said one-way hash function.

6. Method according to claim 5, wherein said first and second information tables are generated by using a random selection of bits of the pay load part at broadcasting and in the decoder, respectively.

7. Apparatus for controlling the operation of a signal decoder in a broadcasting system, comprising means for receiving a broadcast signal with an encrypted signature, means for decrypting said signature, means for comparing the decrypted signature with a verification value, and means for allowing or disallowing normal operation of said decoder in dependence on the result of this comparison being a match or a mismatch, respectively, wherein said signal includes an information table containing identification and control data, said apparatus further comprising means for storing said information table in said memory, means for using said information table to operate the decoder and means for creating said verification value from information in said information table.

8. Apparatus according to claim 7, comprising a memory for storing a public key, wherein said means for decrypting said signature uses said public key for decrypting said signature.

9. Apparatus according to claim 7, wherein said means for creating said verification value includes means to reduce the information table through a one-way hash function to obtain said verification value.

10. Apparatus according to claim 7, said decoder comprising a descrambler and decompression means, wherein said means for allowing or disallowing operation of said decoder is adapted to enable operation of said descrambler if said signature matches said verification value.

11. Apparatus according to claim 7, comprising means for comparing an identification of a transport stream received with a list of identifications in the information table, wherein said means for allowing or disallowing normal operation of said decoder disallow normal operation if the identification of the transport stream received is not on the list.

12. Apparatus for controlling the operation of a signal decoder in a broadcasting system, comprising means for receiving a broadcast signal with an encrypted signature, means for decrypting said signature, means for comparing the decrypted signature with a verification value, and means for allowing or disallowing normal operation of said decoder in dependence on the result of this comparison being a match or a mismatch, respectively, said apparatus further comprising means for creating a second information table from data of said broadcast signal, and means for creating said verification value from information in said second information table.

13. Apparatus according to claim 12, comprising a memory for storing a public key, wherein said means for decrypting said signature uses said public key for decrypting said signature.

14. Apparatus according to claim 12, wherein said means for creating said verification value includes means to reduce the information table through a one-way hash function to obtain said verification value.

15. Apparatus according to claim 12, said decoder comprising a descrambler and decompression means, wherein said means for allowing or disallowing operation of said decoder is adapted to enable operation of said descrambler if said signature matches said verification value.

16. Apparatus according to claim 12, comprising means for comparing an identification of a transport stream received with a list of identifications in the information table, wherein said means for allowing or disallowing normal operation of said decoder disallow normal operation if the identification of the transport stream received is not on the list.

* * * * *